Dec. 22, 1953 W. R. HARDING ET AL 2,663,841
PLURAL-STAGE ROTARY AMPLIFIER
Filed June 14, 1950

WITNESSES:
Robert C. Baird
Wm. C. Groome

INVENTORS
William R. Harding &
Lawrence G. Opel
BY
C. M. Avery
ATTORNEY

Patented Dec. 22, 1953

2,663,841

UNITED STATES PATENT OFFICE 2,663,841

PLURAL-STAGE ROTARY AMPLIFIER

William R. Harding, East Aurora, and Lawrence G. Opel, Buffalo, N. Y., assignors to Westinghouse Electric Corporation, East Pittsburgh, Pa., a corporation of Pennsylvania Application June 14, 1950, Serial No. 168,022

5 Claims. (Cl. 322—92)

Our invention relates to plural-stage rotary amplifiers of the type known from Patent 2,484,835 to A. W. Kimball and W. R. Harding, Patent 2,484,840 to M. Liwschitz and A. W. Kimball, Patent 2,445,788 to B. Litman, and Patent 2,492,982 to G. L. Godwin, all assigned to the assignee of the present invention.

Such amplifiers involve a rotary direct-current machine with a plurality of pole pairs in which the variable excitation of signal field windings produces a controlled distortion of the flux distribution in the multi-pole field structure of the machine and thereby causes an equalizing circulating current to flow between interconnected equipolar commutator brushes; and this internal circulating current is utilized for controlling, in one or several internal amplifying stages, the multi-pole main field excitation of the machine. Thus a plural stage amplification of low time constant is obtained by means of a single machine structure.

For many purposes, such amplifying machines are called upon to provide controlled output voltage in response to polarity reversal of the input voltage applied to the signal field windings. For instance, when such an amplifier is used for regulating the output voltage of a larger dynamo-electric machine, a small amount of power from the output circuit of the regulated machine is fed back into the signal field windings of the amplifier to control the amplifier output voltage. The input voltage of the amplifier then reverses its polarity depending upon whether the voltage of the output circuit of the main machine departs in one or the other sense from the desired value. In such applications the control field induced by the signal field winding goes through a hysteresis cycle due to magnetic retentivity. In the known amplifying machines in which all poles have substantially equal retentivity, the hysteresis loop has the normal configuration, and its effects on the amplifier output voltage may be noticeably detrimental to the accuracy and time constant of the control or regulating performance.

It is an object of our invention to improve the amplifier performance by reducing such hysteresis effects.

To this end, and in accordance with a feature of our invention, we make those equal-polarity poles that are inductively associated with the signal field windings of materials of respectively different magnetic retentivities. According to a more specific feature of the invention, and referring, for instance, to a four-pole machine, we give one of the two signal field poles appreciably higher or lower retentivity than the three other poles. The difference in retentivity can be obtained by employing pole materials of different composition, or by a differentiation in the magnetically effective treatment of the poles, or by applying both possibilities. As a result, the spread of the hysteresis loop is considerably reduced, or the residual magnetism and amplifier output voltage can even be reversed in opposite direction.

The invention will be more fully understood from the following description in conjunction with the drawing in which.

Figures 1, 2, 3, 4:
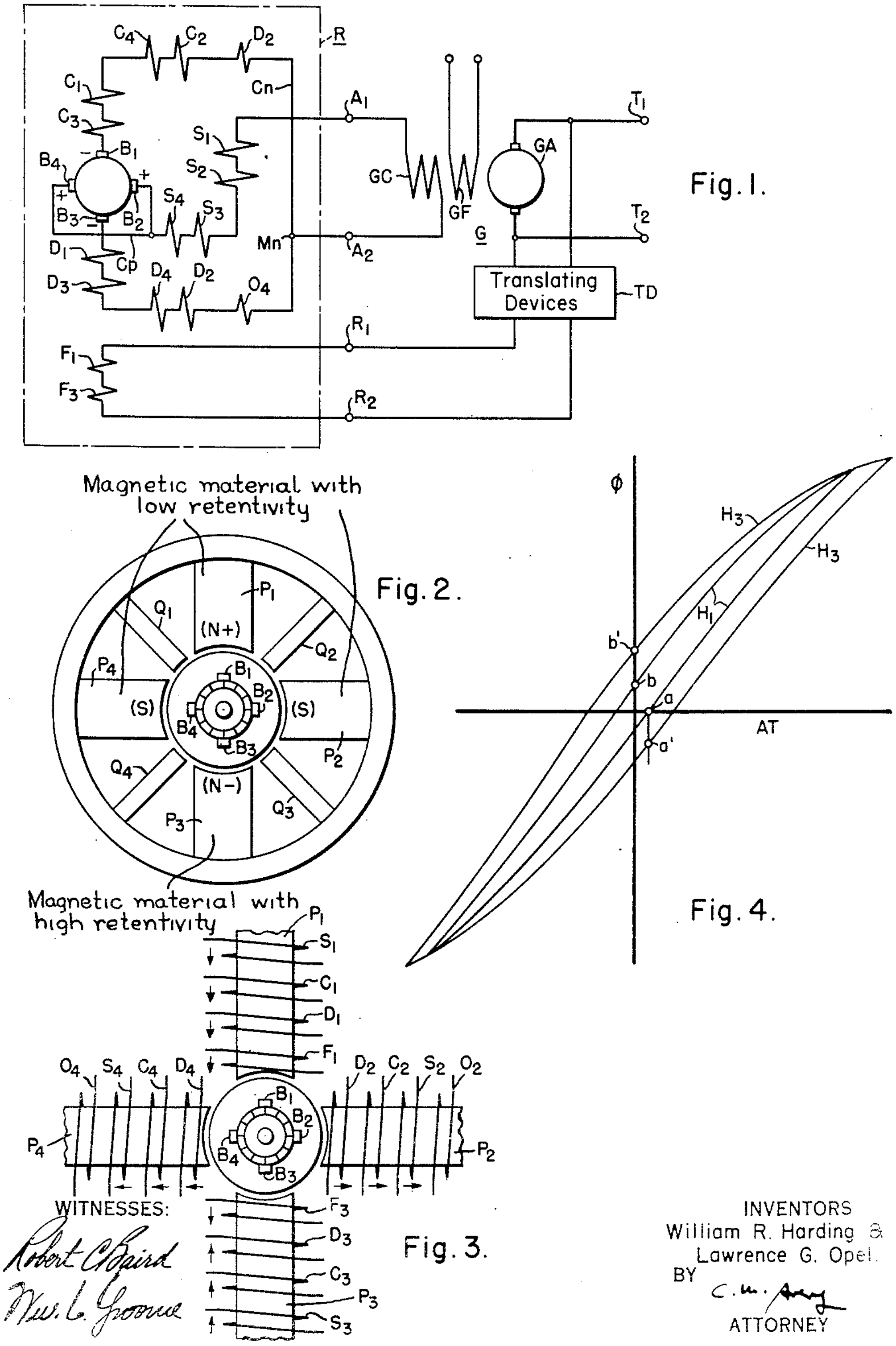
Figure 1 shows the circuit diagram of a dual-stage amplifier according to the invention in conjunction with an alternating-current main machine whose output is to be controlled or regulated by the amplifier.
Fig. 2 shows schematically the field structure of the same amplifier.
Fig. 3 shows diagrammatically the four field poles and the appertaining field windings and the commutator of the same amplifier.
Fig. 4 is a flux diagram explanatory of the operation of the amplifier.

In Fig. 1, the circuits of an amplifying generator according to the invention are shown within the dot and dash line R. This generator has input terminals $R_1$, $R_2$ and output terminals $A_1$ and $A_2$. Attached to the output terminals is the field winding GC of an alternating-current generator G whose armature GA is to provide voltage of constant magnitude across the terminals $T_1$ and $T_2$. The input terminals $R_1$ and $R_2$ of the amplifying generator R are attached across terminals $T_1$ and $T_2$ through rectifying translating devices TD of any suitable known design and operation.

In practice, the input voltage applied to the amplifying generator changes its polarity dependent upon the direction in which the controlled magnitude departs from the desired value. The input voltage thus controls the amplified output voltage impressed across terminals $A_1$ and $A_2$ on the generator field winding GC thereby providing the main generator with the variable field excitation needed to maintain the correct generator output voltage. As mentioned, the polarity reversal of the signal voltage causes hysteresis effects so that in the known generator of this type the amplifier output voltage is not always at the correct value. However, the amplifying generator according to the invention is designed to considerably reduce these effects as will be explained in the following.

The illustrated embodiment of the amplifying generator, as shown in Fig. 2, has a magnetizable field structure with structurally symmetrical main poles $P_1$, $P_2$, $P_3$, $P_4$ and interpoles $Q_1$, $Q_2$, $Q_3$, $Q_4$. A lap-wound armature of normal chording has a commutator with four brushes $B_1$, $B_2$, $B_3$, and $B_4$. During the operation of the generator, with poles $P_1$, $P_2$, $P_3$, $P_4$ properly excited, the poles $P_1$ and $P_3$ are, for instance, north poles, the poles $P_2$ and $P_4$ are south poles, the brushes $B_1$ and $B_3$ have, for instance, a negative potential and the brushes $B_2$ and $B_4$ have a positive potential.

According to Fig. 1, the negative brushes $B_1$ and $B_3$ are interconnected by an internal circuit connection $Cn$. Another internal connection $Cp$ connects the positive brushes $B_2$ and $B_4$.

Only two opposite poles of the same magnetic polarity, in the illustrated example the two north poles $P_1$ and $P_3$, are provided with signal field windings $F_1$ and $F_3$ respectively. These two windings are connected between the input terminals $R_1$ and $R_2$ and are poled so that winding $F_1$, when energized by signal voltage of a given polarity, increases the magnetic strength of pole $P_1$ while winding $F_3$ weakens the strength of the opposite pole $P_3$. Hence, the application of an input signal to terminals $R_1$ and $R_2$ will distort the flux distribution in the field structure in a degree and sense depending upon the intensity and polarity of the signal voltage.

The output terminal $A_1$ is connected with the connection $Cp$ and the output terminal $A_2$ is connected to a midpoint $Mn$ of the connection $Cn$. The connection $Cn$ between the two brushes $B_1$ and $B_3$ includes main or forcing field windings $C_1$, $C_2$, $C_3$, $C_4$ and compensating field winding $O_2$ and $D_1$, $D_2$, $D_3$, $D_4$ and compensating field winding $O_4$. Coils $C_1$ and $D_1$ are arranged on pole $P_1$, coils $C_2$ and $D_2$ on pole $P_2$, coils $C_3$ and $D_3$ on pole $P_3$, and coils $C_4$ and $D_4$ on pole $P_4$. When the signal field windings $F_1$ and $F_3$ are excited, so that an unbalance current circulates through circuit $Cn$, this current passes serially through all forcing coils and magnetizes the four poles equally and symmetrically, thus causing the armature to generate the output voltage which appears across the terminals $A_1$ and $A_2$. When a load is connected to these terminals, as is shown in Fig. 1, the load current flows from brushes $B_2$ and $B_4$ through self-exciting field windings $S_4$, $S_3$, $S_2$ and $S_1$ to terminal $A_1$, through the field winding GC to terminal $A_2$, and from terminal $A_2$ to point $Mn$, and thence in parallel through the coil groups $C_1$, $C_2$, $C_3$, $C_4$ and $O_2$ and $D_1$, $D_2$, $D_3$, $D_4$, and $O_4$ to the brushes $B_1$ and $B_3$. Thus, the load current passes through the forcing coils, but since its direction of flow in coils $C_1$, $C_2$, $C_3$ and $C_4$ is opposite to that in respective coils $D_1$, $D_2$, $D_3$ and $D_4$, the effect of a load current on each pole is cancelled out. Consequently, the load current has no effect on the magnetic excitation of the field structure of the machine, and the magnetizing effect of the forcing coils is controlled only by the unbalance current or voltage difference between brushes $B_1$ and $B_3$, this voltage difference being caused and controlled by the excitation of the signal field windings $F_1$ and $F_3$ as explained above.

In amplifying generators of this type it is necessary to compensate the effect of armature reaction on the flux through poles $P_1$ and $P_3$ produced by the signal windings $F_1$ and $F_3$. For this purpose, one or both of the internal connections $Cp$ and $Cn$ are also equipped with compensating or opposition field windings. For instance, such windings $O_2$ and $O_4$ may be connected in the circuit $Cn$ and may be disposed on poles $P_2$ and $P_4$ respectively. It is likewise necessary to equip the four interpoles $Q_1$, $Q_2$, $Q_3$, $Q_3$ with interpole windings (not shown) which are connected in the two internal circuits $Cp$ and $Cn$. Such interpole windings as well as other designs and connections of compensating or opposition windings for eliminating the detrimental effect of armature reaction are known as such from the above-mentioned patents, not essential for an understanding of the present invention proper, and hence not further described in this specification.

The amplifying machine according to the illustrated embodiment is equipped with self-excitation field windings which are energized by the output voltage or output current of the machine. Four such self-excitation field windings $S_1$, $S_2$, $S_3$, $S_4$ are shown in Figs. 1 and 3 as being connected in series with the generator output circuit. Self-excitation windings shunt connected to the generator output terminals, or compound arrangements, of series and shunt windings are likewise applicable. It will be recognized that the self-excitation windings are not energized by the internal circulating currents in connection $Cn$ or $Cp$, but are excited in accordance with the generator output. The resistance of the field circuit including the self-excitation windings is preferably adjusted so that the resistance characteristic coincides substantially with the initial and linear portion of the no-load magnetization characteristic of the machine; and the machine normally operates along this linear portion of its magnetic characteristic. Then, the self-excitation windings provide substantially all of the excitation needed for maintaining the output voltage of the amplifying generator at the desired value so that the signal field windings and the forcing field windings need only supply the additional stimulus needed to shift the output voltage up or down along the characteristic.

It is essential for the invention that in the illustrated and above-described amplifying machine the four field poles are not identical in magnetic respects, but are designed with a marked difference in magnetic retentivity between those field poles that are magnetically associated with the signal field windings $F_1$ and $F_3$. It is preferable for machines of this type to compose the field structure of laminated material of low retentivity, for instance of a highly permeable magnetic alloy known under the trade name "Hypernik," consisting of essentially 40% to 60% nickel and 60% to 40% iron, annealed for optimum magnetic qualities. A preferable material, for instance, consists essentially of about equal percentages of iron and nickel. If this material is used in generators according to the invention, only three of the four field poles consist of such a material, while one of the two poles associated with the signal windings is given considerably higher magnetic retentivity preferably by making it of dynamo steel. For instance, poles $P_1$, $P_2$ and $P_4$ in the illustrated embodiment consist of the above-mentioned annealed iron-nickel alloy while the pole $P_3$ consists of annealed dynamo steel. The pole $P_1$ may be annealed in hydrogen in order to further reduce its retentivity. In machines thus designed, the detrimental effects of hysteresis are considerably reduced. This reduction can be explained as set forth in the following with reference to Fig. 4.

The abscissa of the coordinate diagram shown in Fig. 4 represents ampere turns (AT) of signal field excitation effective in the generator pole structure. The ordinate represents the magnetic flux ($\phi$) induced by this field excitation. The magnetization characteristic of the iron nickel pole $P_1$ of comparatively low retentivity is represented by the hysteresis loop $H_1$. The corresponding hysteresis loop of pole 3 having comparatively high retentivity is exemplified at $H_3$. Curves of this type have been obtained by taking the output voltage across terminals $A_1$ and $A_2$ as a measure of flux and taking the excitation in milliamperes applied to the input terminals $R_1$ and $R_2$ as a measure of the ampere turns, the field circuit of the field excitation windings $S_1$, $S_2$, $S_3$, $S_4$ being tuned to the linear portion of the magnetic machine characteristic as mentioned in the foregoing.

Under the conditions represented by points $a$ and $a'$ in Fig. 4, the flux of the pole $P_1$ (also of poles $P_2$ and $P_4$) is zero, but pole $P_3$ retains a negative flux, that is, the flux of pole $P_3$ is then in the same direction as a flux produced by current flowing from signal winding $F_1$ to signal winding $F_3$. This flux produces between brushes $B_1$ and $B_3$ a voltage difference of the polarity needed to raise the output voltage across terminals $A_1$ and $A_2$, thus counteracting the residual ampere turns.

Under the conditions according to points $b$ and $b'$, the output voltage across terminals $A_1$ and $A_2$ should be zero. However, the retentivity of pole $P_3$ is higher than that of pole $P_1$ and the flux in pole $P_3$ is in such a direction as to produce an output voltage across terminals $A_1$ and $A_2$ as if a current were flowing in the signal winding circuit from signal winding $F_3$ to winding $F_1$. Consequently, a voltage difference exists between brushes $B_1$ and $B_3$ and produces in the forcing field windings an amount of ampere turns, which further reduces the flux in pole $P_1$ and therefore act as a coercive force toward reducing the residual ampere turns.

The amount of reduction in the effects of hysteresis will be appreciated from the fact that, according to results of tests, a residual current between the generator output terminals of 12 milliamperes was measured with four main poles of an annealed 50-50 iron nickel alloy, while in a machine of the same design and dimensions but having three poles of the just-mentioned annealed alloy and one signal field pole of annealed steel, the residual current was 8 milliamperes, other conditions being equal.

In other machines built according to the invention, the residual output current was further reduced and, by using one pole from heat-treated high-carbon steel of high retentivity, was reversed to a negative value.

It will be understood that the specific control application of Fig. 1 referred to in the foregoing is presented only for the purpose of explanation but is not essential to the invention proper. Indeed machines according to the invention are applicable for amplifying purposes in general and in circuit combinations other than those specifically shown on the drawing. For example, the amplifier may be used for providing at its output terminals only a positive, a negative or reversible corrective voltage rather than all of the field excitation needed in a controlled machine. This is the case if in a control system, otherwise as shown in Fig. 1, the main generator G is equipped with a main field winding to provide normal field excitation and with auxiliary field winding to provide only an additional corrective field for control or regulating purposes, the amplifying generator according to the invention then being connected only to the auxiliary field winding to apply reversible amplified voltage thereto. In such and other cases the amplifying generator will not be equipped with the above-mentioned self-excitation windings so that the amplified output voltage is zero when the signal field voltage is zero. It is apparent that the reduction of hysteresis effects is especially advantageous for such reversible-output amplifier. It is further obvious that the invention is similarly applicable to the machines of the various other designs and of different numbers of poles and commutator brushes disclosed in the above-mentioned patents. It will also be understood by those skilled in the art that the arrangement and connections of the various windings and circuits of the machine can readily be modified in other respects without departing from the essential feature of the invention.

We claim as our invention:

1. An amplifying direct-current machine comprising a field structure with at least two pairs of salient poles, an armature having a commutator with pairs of brushes for each pair of poles, field windings on said respective poles, two brushes of the same electric polarity being connected with each other through said field windings, a control winding inductively associated with two of said poles of the same magnetic polarity to produce a controlled voltage difference between said two brushes for energizing said field windings, said latter two poles having respective magnetic retentivities different from each other.

2. An amplifying direct-current machine comprising a field structure with at least two pairs of salient poles, an armature having a commutator with pairs of brushes for each pair of poles, field windings on said respective poles, two brushes of the same electric polarity being connected with each other through said field windings, a control winding inductively associated with two of said poles of the same magnetic polarity to produce a controlled voltage difference between said two brushes for energizing said field windings, one of said latter two poles having a higher magnetic retentivity than all other poles of said structure.

3. A rotary direct-current machine, comprising a magnetic field structure having at least one pair of oppositely arranged north poles and at least one pair of oppositely arranged south poles, an armature having a commutator with a plurality of brushes of sequentially different polarities, one brush for each of said poles, a circuit connection connecting the brushes of one polarity, a circuit connection connecting the brushes of the other polarity, field windings disposed on both said pairs of poles and series-connected in at least one of said connections, an output circuit connected across said two connections, an input circuit having signal windings disposed on one of said pole pairs to produce controlled internal circulating currents in said connections, one pole of said one pole pair having substantially the same magnetic retentivity as the two poles of said other pole pair, and the other pole of said one pair having a higher retentivity.

4. An amplifying direct-current machine comprising a field structure with pairs of salient poles, an armature having a commutator with pairs of brushes, field windings on said respective poles, two brushes of the same electric polarity being connected with each other through said field windings, a control winding inductively associated with two of said poles of the same magnetic polarity to produce a controlled voltage difference between said two brushes for energizing said field windings, one of said latter two poles consisting substantially of a magnetizable and low-retentive alloy of approximately equal parts of iron and nickel, and the other of said latter two poles consisting substantially of steel of higher retentivity.

5. An amplifying direct-current dynamo, comprising a field structure having four equally spaced poles alternately of north and south polarities so that poles of like polarity are opposite each other, an armature having a commutator with four brushes alternately of positive and negative electric polarities, a connection between said positive brushes, another connection between said negative brushes, field coils disposed on all four poles respectively and series disposed in one of said connections, an output circuit connected across said two connections, an input circuit having control windings disposed only on two opposite poles of one polarity for weakening one and strengthening the other in response to variable signal excitation, one of said latter two poles having higher magnetic retentivity and the other having lower retentivity than said other two poles.

WILLIAM R. HARDING.
LAWRENCE G. OPEL.

References Cited in the file of this patent

UNITED STATES PATENTS

| Number | Name | Date |
|---|---|---|
| 1,367,293 | Burke | Feb. 1, 1921 |
| 2,303,293 | Thomas | Nov. 24, 1942 |
| 2,445,788 | Litman | July 27, 1948 |